United States Patent [19]

Hikishima

[11] Patent Number: 4,841,794
[45] Date of Patent: Jun. 27, 1989

[54] TRANSMISSION FOR SELF-PROPELLED WALKING MOWERS

[75] Inventor: Keisaku Hikishima, Kobe, Japan

[73] Assignee: Kanzaki Kokyukoki Mfg. Co., Ltd., Amagasaki, Japan

[21] Appl. No.: 195,778

[22] Filed: May 19, 1988

[30] Foreign Application Priority Data

Jun. 10, 1987 [JP] Japan .............................. 62-89418[U]
Oct. 14, 1987 [JP] Japan ............................ 62-157193[U]

[51] Int. Cl.$^4$ ............................................. F16H 3/08
[52] U.S. Cl. ........................................ 74/371; 74/372; 56/11.5; 56/11.8
[58] Field of Search ................ 74/371, 372, 373, 369, 74/333; 56/10.8, 11.5, 11.7, 11.8

[56] References Cited

U.S. PATENT DOCUMENTS

| | | | |
|---|---|---|---|
| 2,416,154 | 2/1947 | Chilton | 74/371 |
| 3,354,739 | 11/1967 | Ivanchich | 74/372 |
| 3,812,735 | 5/1974 | Von Kaler et al. | 74/371 |
| 4,103,566 | 8/1978 | Von Kaler et al. | 74/701 |
| 4,662,241 | 5/1981 | Edwards | 74/371 X |
| 4,702,119 | 10/1987 | Edwards | 74/371 |
| 4,713,983 | 12/1987 | Rundle | 74/371 X |
| 4,779,475 | 10/1988 | Irikura et al. | 74/371 |

FOREIGN PATENT DOCUMENTS

| | | | |
|---|---|---|---|
| 472361 | 12/1914 | France | 74/371 |
| 59-68047 | 5/1984 | Japan . | |
| 60-79919 | 6/1985 | Japan . | |
| 60-168325 | 11/1985 | Japan . | |
| 61-56015 | 3/1986 | Japan . | |
| 61-135057 | 8/1986 | Japan . | |

*Primary Examiner*—Dwight G. Diehl

[57] ABSTRACT

Within a transmission casing (3) having therein a drive shaft (4), driven by an engine (1) through a main clutch (2), and a hollow speed-change shaft (5), a key-shift transmission mechanism (8) is disposed which comprises a plurality of meshing gears (9I-9V, 10I-10V) mounted respectively on the drive and change shafts. An axle (6) drivingly connected to left and right drive wheels (7) extends through the hollow change shaft. One end of the change shaft is spaced from an inner wall surface of the transmission casing for disposing therebetween an auxiliary clutch (13) which is operable between the change shaft and axle. Both of the main and auxiliary clutches are operated together.

The transmission mechanism is provided for a plurality of variable speeds of a mower in a compact fashion owing to a co-axial arrangement of the hollow change shaft and the axle passing therethrough. The auxiliary clutch which is provided also in a compact fashion permits to shift the transmission mechanism lightly and to pull the mower for retreating same with ease.

3 Claims, 7 Drawing Sheets

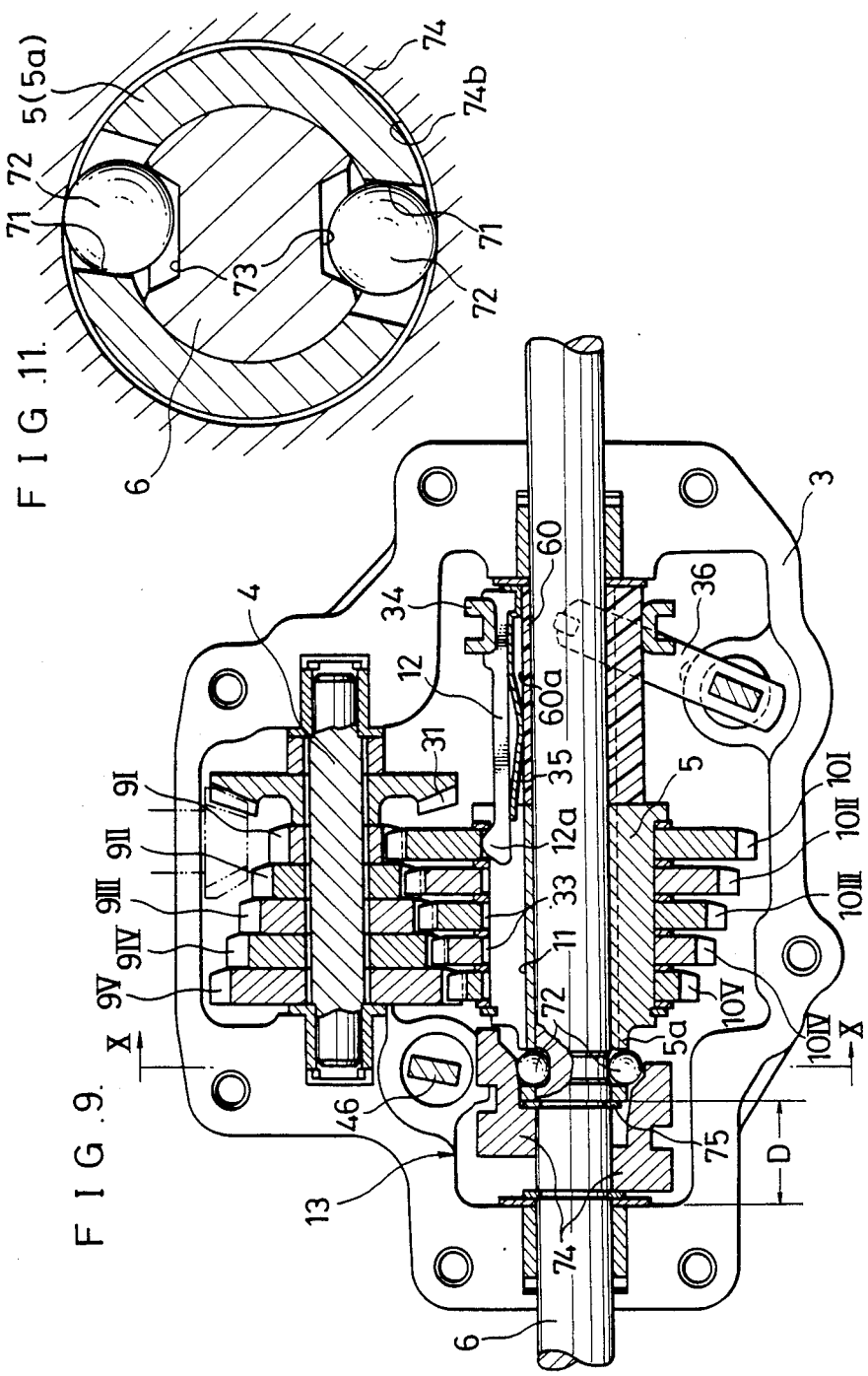

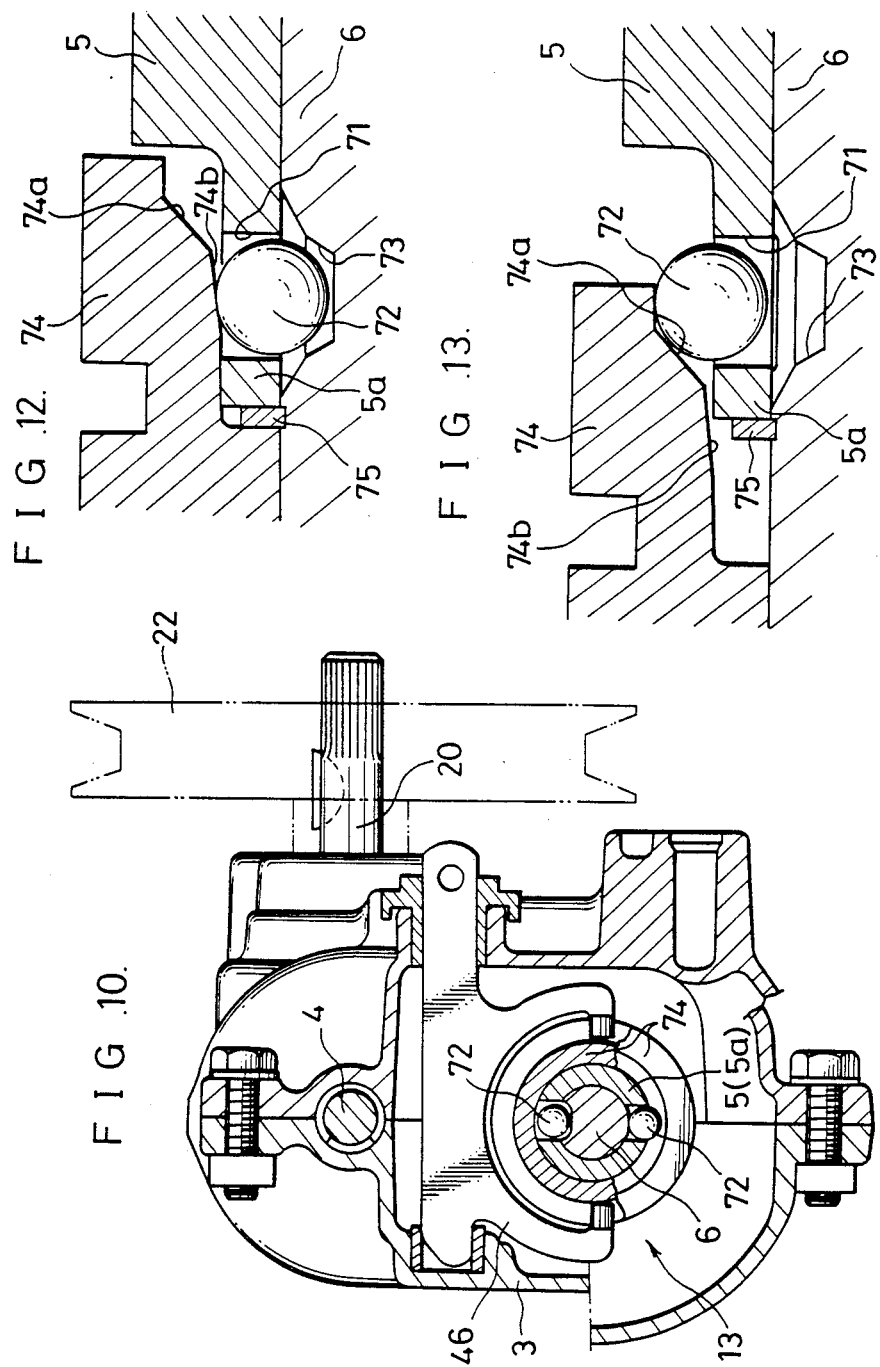

TRANSMISSION FOR SELF-PROPELLED WALKING MOWERS

FIELD OF THE INVENTION

This invention relates to a transmission for self-propelled walking mowers.

BACKGROUND OF THE INVENTION

As is disclosed in, for example, JP, A No. 61-56015, JP, A(U) No. 59-68047, JP, A(U) No. 60-79919 and JP, A(U) No. 60-168325, a transmission for propelling a walking mower according to the prior art is, in general, fashioned such that it transmits power of an engine to left and right drive wheels without a speed-change control and only with a speed-reduction control.

A prior art transmission including a speed-change mechanism is known from JP, A(U) No. 61-135057. Although structure of the speed-change mechanism cannot be understood exactly from the specification and drawings of this laid-open application, it is believed that the change mechanism provides only few variable speeds, such as two variable speeds, of a walking mower.

The reason why a transmission for walking mowers has been fashioned to have no speed-change mechanism or to have a speed-change mechanism providing only few variable speeds, as described above, is that a compactness of the transmission is to be secured so as to eliminate a limitation against the arrangement of a mowing cutter and so as not to sacrifice a compactness of the whole of a mower. It is believed, however, very convenient if speed of a walking mower could be selected from a plurality of variable speeds in accordance with height and/or density of turfs, operator's liking and so on. Further, it is wished to travel a walking mower with a relatively high speed when the mower is not used for mowing and is merely travelled.

OBJECT

Accordingly, a primary object of the present invention is to provide a novel transmission for self-propelled walking mower in which a key-shift transmission or speed-change mechanism, known from, for example, U.S. Pat. Nos. 3,812,735 and 4,103,566 and providing a plurality of variable speeds with a compact structure, is employed in a compact fashion.

BRIEF DESCRIPTION OF THE DRAWINGS

Other objects and advantages of the invention will become readily apparent as the specification is considered in conjunction with the accompanying drawings, in which:

FIG. 9 is a sectional plane view similar to FIG. 1, but showing an essential part of a second embodiment of the transmission according to present invention;

FIG. 10 is a sectional view taken generally along line X—X of FIG. 9;

FIG. 11 is an enlarged sectional view of a part of the second embodiment;

FIG. 12 is an enlarged sectional plane view of a part of the second embodiment; and FIG. 13 is an enlarged sectional plane view of the part shown in FIG. 12, showing a state different from that shown in FIG. 12.

SUMMARY OF THE INVENTION

Figure 2:
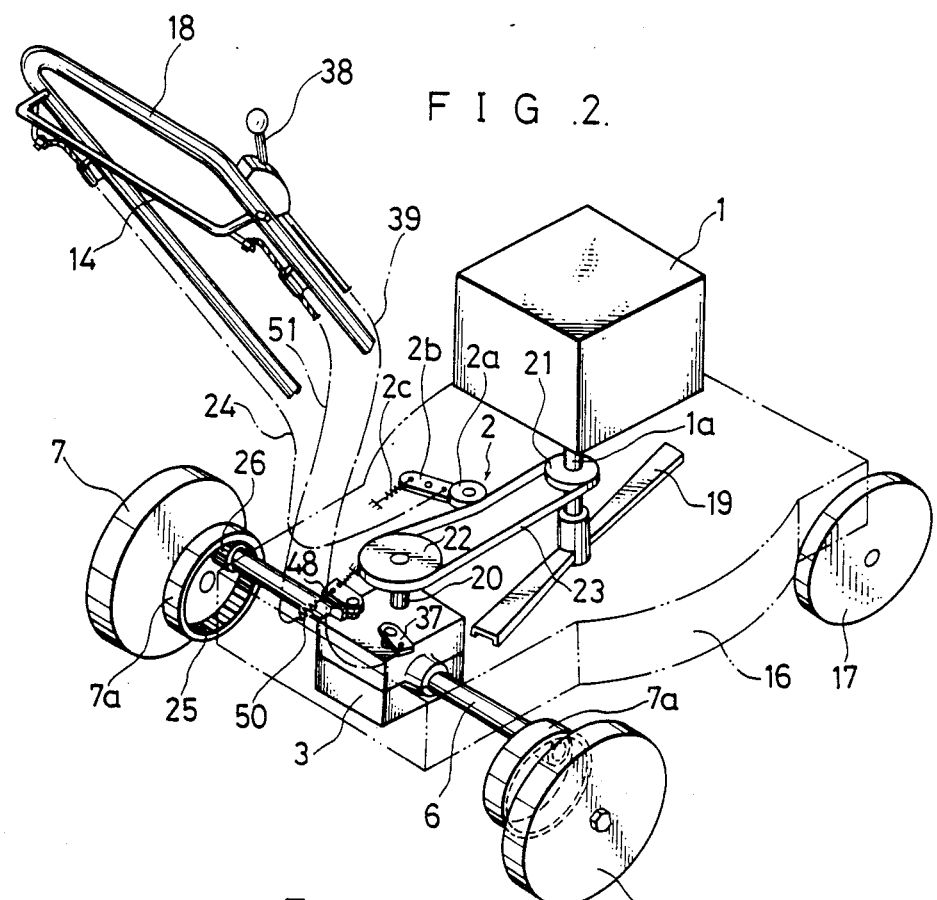
FIG. 2 is a schematic perspective view, partially cut away, of a self-propelled walking mower in which the first embodiment is employed.

The present invention relates to a transmission for self-propelled walking mower which comprises, as shown in FIG. 2, an engine 1, a main clutch 2, and a transmission casing 3.

Figure 1:
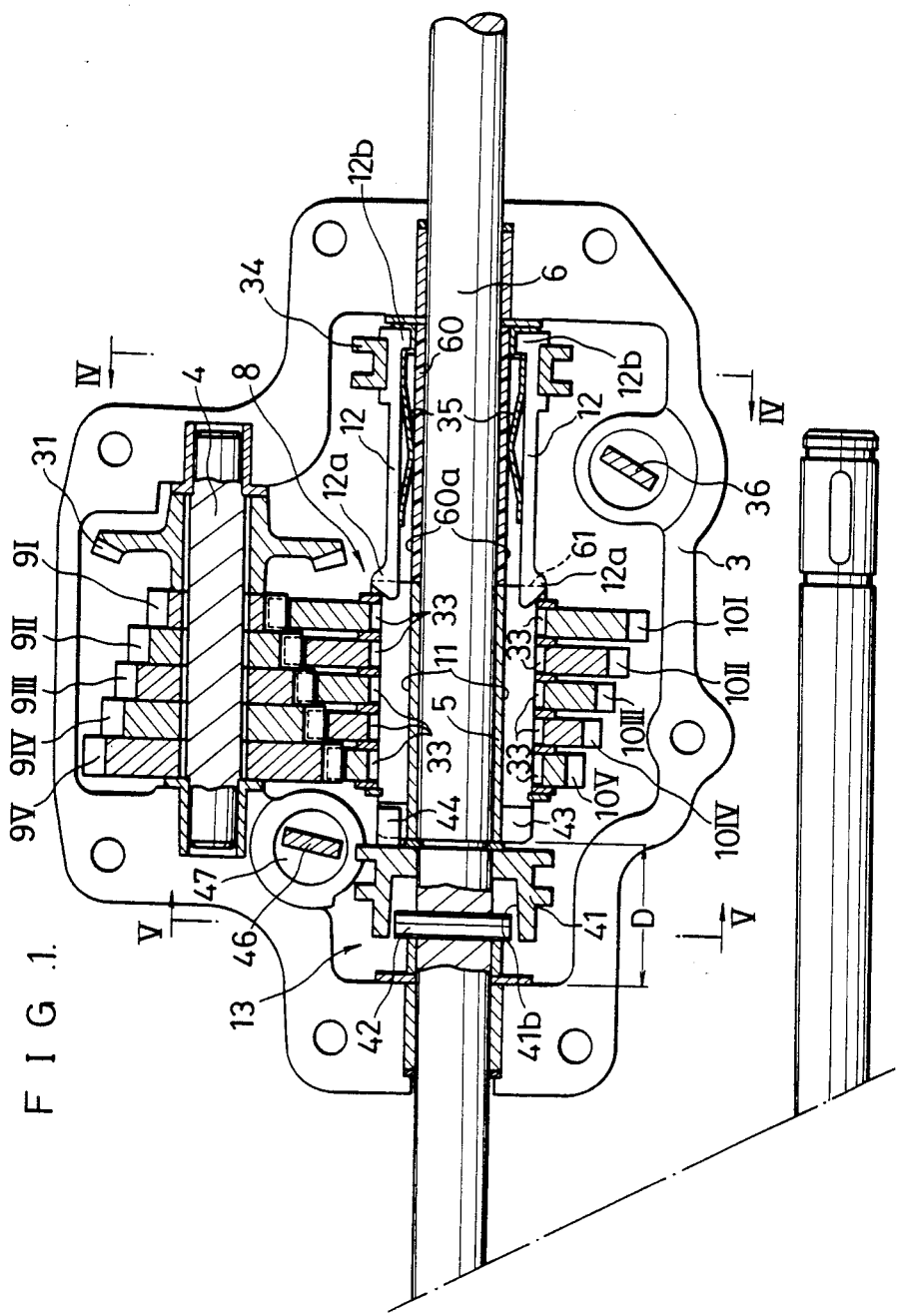
FIG. 1 is a sectional plane view of a transmission casing employed in a first embodiment of the transmission according to the present invention.

As shown respectively in FIG. 1 and in FIG. 9, the transmission according to the present invention further comprises a drive shaft 4 and speed-change shaft 5 which are journalled respectively in the transmission casing 3 and extend parallel with each other. The drive shaft 4 is connected drivenly to the engine 1 through the main clutch 2. The speed-change shaft 5 is formed particularly of a hollow shaft. One end of such hollow speed-change shaft 5 is spaced axially from an inner wall surface of the transmission casing 3 by an interval D, as shown respectively in FIG. 1 and in FIG. 9.

Figure 3:
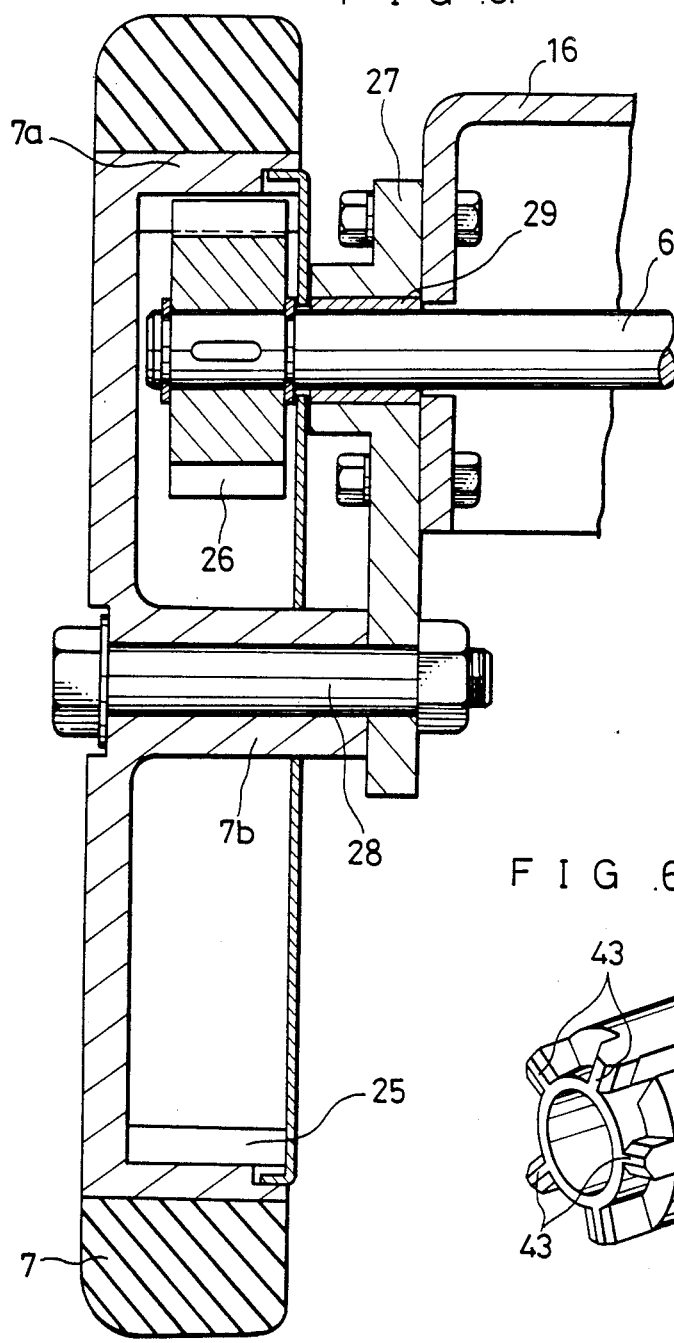
FIG. 3 is a vertical sectional view, showing a rear wheel assembly in the walking mower shown in FIG. 2.

As also shown respectively in FIG. 1 and in FIG. 9, an axle 6 extends through the hollow speed-change shaft 5 and through the transmission casing 3. Such axle 6 is drivingly connected, as shown in FIGS. 2 and 3, to left and right drive wheels 7.

Within the transmission casing 3 is disposed a key-shift transmission mechanism 8, as shown respectively in FIG. 1 and in FIG. 9. Such transmission mechanism 8 has a plurality of drive gears 9I, 9II, 9III, 9IV and 9V which are fixedly mounted on the drive shaft 4, a plurality of speed-change gears 10I, 10II, 10III, 10IV and 10V which are rotatably mounted on the speed-change shaft 5 and are meshed respectively with the drive gears 9I-9V, and a shift key 12 which is disposed slidably within an elongated axial groove 11 in the outer surface of the speed-change shaft 5 and includes a gear-engaging lug 12a for coupling the speed-change gears 10I--10V one at a time to the change shaft 5.

As shown respectively in FIG. 1 and in FIG. 9, an auxiliary clutch 13 is disposed within the interval D referred to before. This clutch 13 is fashioned such that it is operable to connect and disconnect between the speed-change shaft 5 and axle 6. A clutch lever 14 shown in FIG. 2 is provided which is connected to both of the main and auxiliary clutches 2 and 13 and is operable to engage and disengage these clutches together.

During a mowing operation using a walking mower including the transmission according to the present invention, speed of the walking mower can be selected from a plurality of variable speeds by a shifting operation of the key-shift transmission mechanism 8. Such selection of the speed is made in accordance with height and/or density of turfs, operator's liking and so on. When the walking mower is merely travelled, a relatively high speed of the mower may be attained by shifting the key-shift transmission mechanism 8 to its highest speed ratio.

Before a shifting operation of the key-shift transmission mechanism 8, the main clutch 2 is disengaged by the clutch lever 14. Because the auxiliary clutch 13 is disengaged at the same time, the speed-change shaft 5 is made freely rotatable on the axle so that the shifting operation can be carried out lightly.

When an operator intends to retreat the walking mower by pulling same in such a case where unmowed turfs are found behind the mower, the main clutch 2 is disengaged for disconnecting the axle 6 from engine 1. In this case, too, the auxiliary clutch 13 becomes disengaged so that the axle 6 is disconnected from the speed-change shaft 5. Consequently, gearing which is incorporated between the main clutch 2 and speed-change shaft 5 and has a speed-reducing function does not provide a resistance against a pulling operation for treating the mower so that the operator can retreat the mower with ease.

In the transmission according to the present invention, the hollow speed-change shaft 5 is employed, and is arranged coaxially with the axle 6 by passing the axle through the change shaft. Such speed-change shaft 5 permits to provide the key-shift transmission mechanism 8 having a plurality of change ratios without sacrificing a compactness of the transmission or the casing 3 thereof. Further, the auxiliary clutch 13, by which both of the shifting operation and mower-retreating operation are made easy as described above, is provided in a compact fashion by utlizing the coaxial arrangement of speed-change shaft 5 and axle 6 and by utilizing the interval (D) between one end of the change shaft and an inner wall surface of the transmission casing 3.

DESCRIPTION OF PREFERRED EMBODIMENTS

In FIGS. 1 to 8, a first preferred embodiment is shown.

In FIG. 2 which depicts schematically the whole of a walking mower in which the embodiment is employed, numeral 16 designates a machine frame or deck which supports left and right front wheels 17 freely rotatably. To a rear end portion of the deck 16 is attached a steering handle 18 which extends upwardly and backwardly from the deck. The engine 1 referred to before is mounted on the deck 16. Drive wheels also referred to before are provided by left and right rear wheels 7. A mowing cutter 19 driven by engine 1 is arranged at a lower side of the deck 16.

As also shown in FIG. 2, the transmission casing 3 referred to before is fixedly secured to a rear end portion of the deck 16 and has an input shaft 20 extending upwardly from the casing. Engine output shaft 1a has thereon a pulley 21. A belt 23 is entrained over this pulley 21 and another pulley 22 fixedly mounted on the input shaft 20. The main clutch 2 referred to before is provided by a belt-tightening clutch comprising a tightening roller 2a which tightens the belt 23 when it is pressed against the belt. This roller 2a is supported by a rotatable arm 2b which is biased by a spring 2c to rotate towards a direction to move the roller 2a away from the belt 23 and which is connected through a control cable 24 to the clutch lever 14 referred to before. The clutch lever 14 shown is fashioned such that when it is grasped or operated the main clutch 2 becomes engaged so as to tighten the belt 23.

As shown in FIGS. 2 and 3, the wheel disk 7a of each rear wheel 7 is formed with an internal gear 25 with which a gear 26 attached to each end of the axle 6 is meshed so as to transmit rotation of the wheel axle to each rear wheel 7 with a reduced speed of rotation of about a quarter. To each side wall of the deck 16 is attached an axle-supporting plate 27 having a pin 28 secured thereto by which each rear wheel 7 is rotatably supported at a central boss 7b of the wheel disk 7a. Each end portion of the axle 6 is supported by the plate 27 through a bushing 29.

Figure 4:
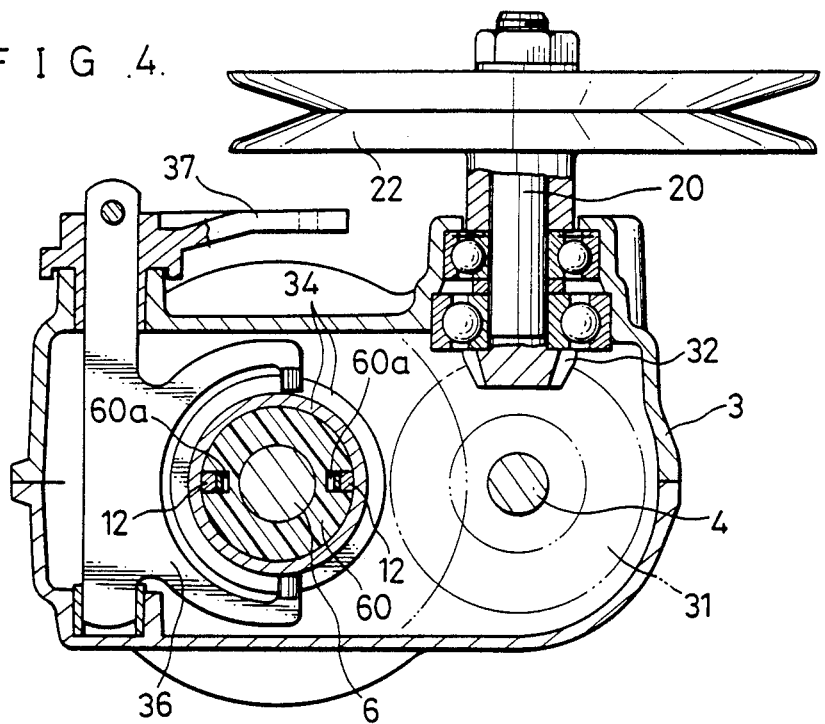
FIG. 4 is a sectional view taken generally along line IV—IV of FIG. 1.
Figure 5:
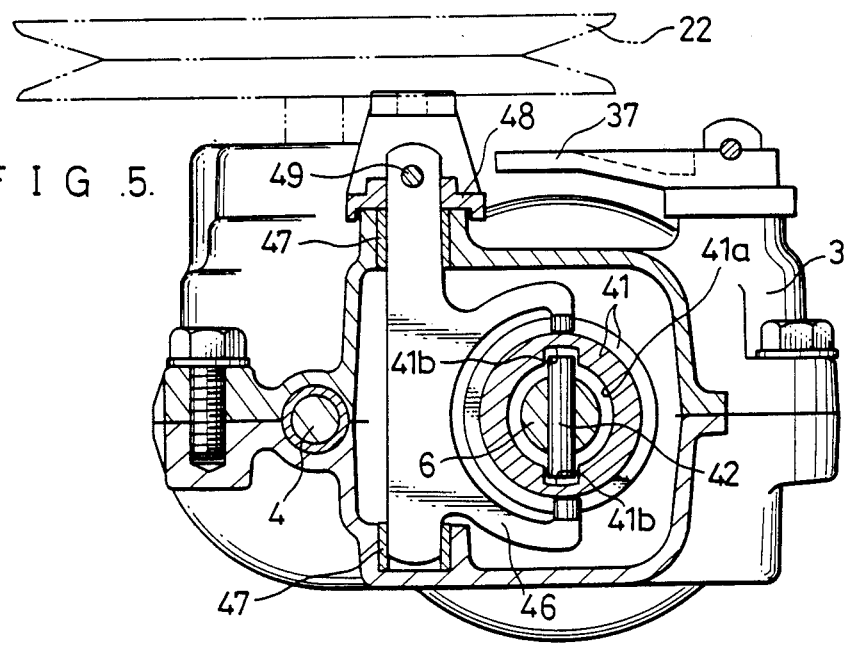
FIG. 5 is a sectional view taken generally along line V—V of FIG. 1.

As shown in FIGS. 4 and 5, the transmission casing 3 is composed of mutually jointed upper and lower casing halves. As shown in FIGS. 1 and 4, a large bevel gear 31 is fixedly mounted on one end portion of the drive shaft 4. This bevel gear 31 is meshed with a smaller bevel gear 32 which is formed integrally with an inner end portion of the input shaft 20. Five drive gears 9I–9V are fixedly mounted on the drive shaft 4, and five speed-change gears 10I–10V are rotatably mounted on the speed-change shaft 5. These gears 9I–9V and 10I–10V are meshed respectively so as to provide first to fifth speed-change gear trains between the shafts 4 and 5.

As shown in FIG. 1, two of the elongated axial grooves 11 referred to before are formed in the outer surface of speed-change shaft 5 and two of the shift keys 12 referred to before are provided. As is usual in a key-shift transmission mechanism, each of the speed-change gears 10I–10V on the shaft 5 has at the inner circumference thereof recesses 33 into which key-engaging lugs 12a of the shift keys 12 may project. The hollow speed-change shaft 5 shown has one end, spaced from a side wall of the transmission casing 3 by the interval D referred to before, and the other end which takes a middle position between two side walls of the casing. On the axle 6 is further mounted a hollow support shaft 60 of a synthetic resin having at its outer surface two elongated axial grooves 60a which are aligned axially with the grooves 11 in the change shaft 5. On this support shaft 60 is slidably mounted a shifter sleeve 34 to which the shift keys 12 are attached so that these keys are moved axially within the grooves 11 and 60a by a sliding movement of the shifter sleeve. For biasing each shift key 12 to move towards a direction such that gear-engaging lug 12a thereof is projected radially outwardly of the speed-change shaft 5, a leaf spring 35 is disposed within the elongated grooves 11 and 60a and is attached to an inward projection 12b on a base end portion of the key 12. Such leaf spring 35 is shaped so that it is in a slidable engagement at a mid portion thereof with the bottom surfaces of grooves 11 and 60a and resiliently engages at its free end portion to the shift key 12. Outer diameter of the change shaft 5 is made somewhat larger than that of the support shaft 60 and an annular stopper surface 61 for limiting the displacement of shifter sleeve 34 is provided by a portion of an end face of the change shaft 5 which portion extends radially outwardly over the support shaft 60.

For displacing the shifter sleeve 34 axially of the support shaft 60, a shifter fork 36 shown in FIG. 4 is provided which is supported by the transmission casing 3 rotatably about a vertical axis and is engaged to the shifter sleeve. To this shifter fork 36 is attached a shifter arm 37 which is disposed above the transmission casing 3. As shown in FIG. 2, the shifter arm 37 is connected through a control cable 39 to a change lever 38 provided to the steering handle 18. The shifter sleeve 34 is operated to slide by the control mechanism detailed above so as to displace the shift keys 12 selectively to one of a neutral position, where the gear-engaging lugs 12a do not engage any of the change gears 10I–10V as shown in FIG. 1, and five operative positions where the lugs 12a project into the recesses 33 of one of the change gears 10I–10V so as to couple the gear to the change shaft 5.

Figure 6:
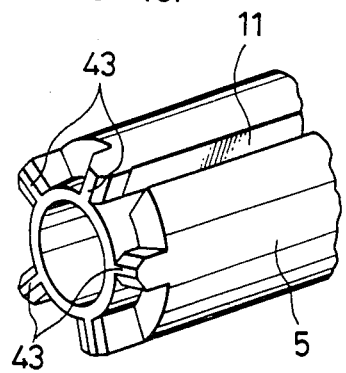
FIG. 6 is a perspective view, showing one end portion of a hollow change-shaft shown in FIG. 1.

As shown in FIGS. 1 and 5, the auxiliary clutch 13 referred to before has a clutch sleeve 41 which is mounted on the axle 6 slidably within the interval D referred to before. This clutch sleeve 41 includes an annular groove 41a, having an inner diameter larger than the outer diameter of axle 6, and a pair of opposed recesses 41b formed in the peripheral surface of the annular groove 41b. To the axle 6 is fixedly secured a pin 42 which projects at both ends thereof into the recesses 41a referred to above so as to connect the clutch sleeve 41 co-rotatably to the axle 6. The pin 42 also provides a stopper means which limits a sliding movement of the clutch sleeve 41 towards a direction away from the speed-change shaft 5. As shown in FIG. 6, the hollow change shaft 5 is formed at one end portion thereof with a suitable number of clutch teeth 43 which are disposed intermittently along a circular direction. Corresponding clutch teeth 44 shown in FIG. 1 are provided to the clutch sleeve 41. The auxiliary clutch 13 is fashioned such that it is engaged when the clutch teeth 44 of clutch sleeve 41 are meshed with the clutch teeth 43 of change shaft 5.

Figure 7:
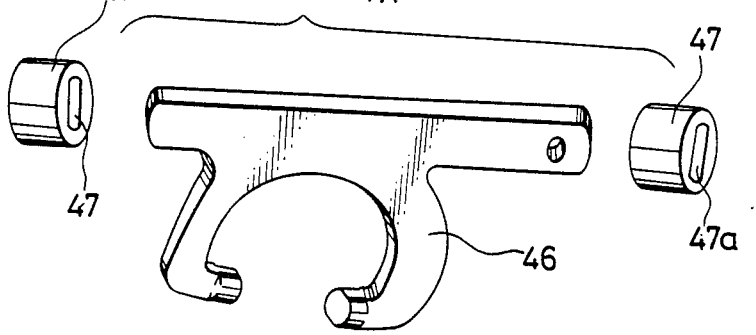
FIG. 7 is a perspective view, showing a control fork mechanism employed in first embodiment in a disassembled state.

For displacing the clutch sleeve 41 so as to engage and disengage the clutch 13, a control fork 46 shown in FIG. 5 is provided which is supported by the transmission casing 3 rotatably about a vertical axis and is engaged to the clutch sleeve 41. As shown in FIG. 7, the control fork 46 is made of a plate material by punching and is adapted to be supported by the transmission casing rotatably through a pair of cylindrical members 47 each having a bore 47a into which a portion of the fork is fitted. The shifer fork 36 shown in FIG. 4 is fashioned similarly.

Figure 8:
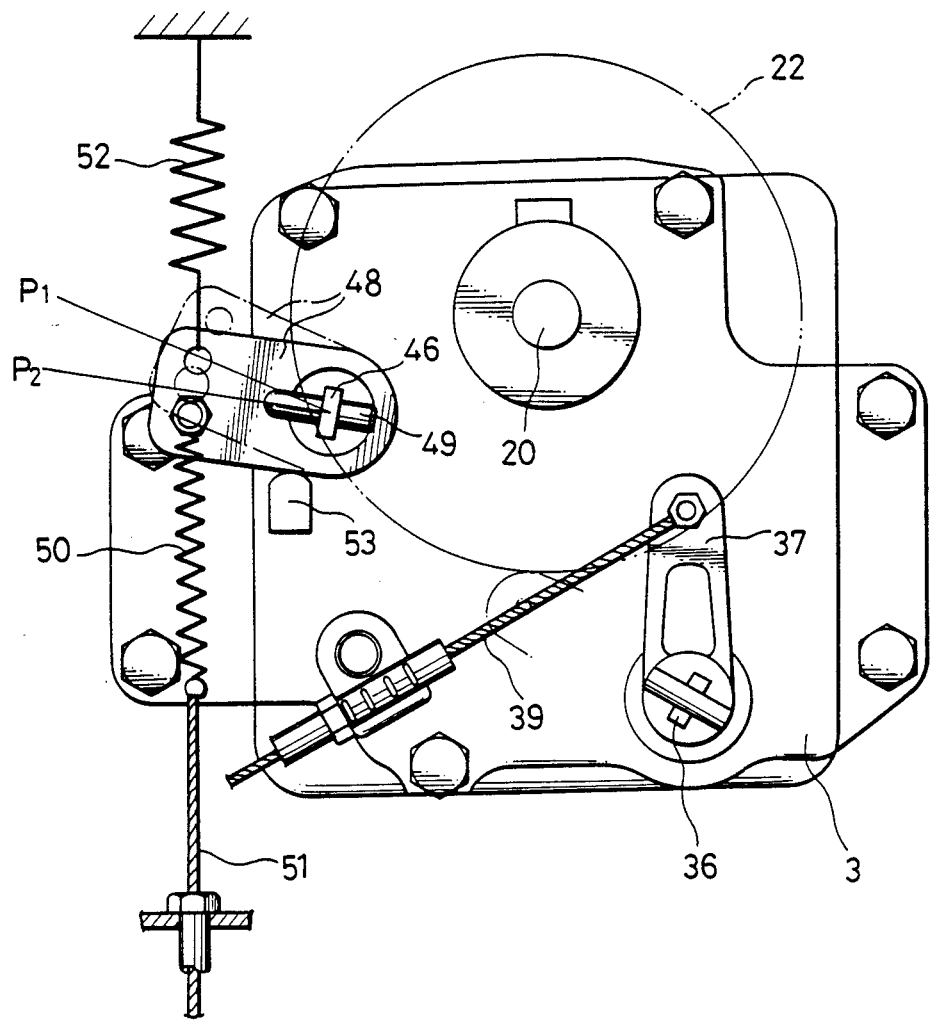
FIG. 8 is a plane view, partially omitted, of the transmission casing shown in FIG. 1.

An upper end portion of the control fork 46 which is projected upwardly from the transmission casing 3 carries a clutch arm 48 which is prevented from getting-out by a pin 49, as shown in FIGS. 5 and 8. As shown in FIGS. 2 and 8, this clutch arm 48 is connected to the clutch lever 14, referred to before, through a spring 50 and control cable 51. As shown in FIG. 8, the clutch arm is biased by another spring 52 to move towards a direction away from the spring 50 and cable 51. The auxiliary clutch 13 shown in fashioned such that the clutch sleeve 41 shown in FIGS. 1 and 5 is located at a clutch-disengaging position under the biasing of such another spring 52 when the clutch lever 14 is not grasped or operated.

Consequently, the auxiliary clutch 13 becomes engaged when the control cable 51 is pulled by an operation of the clutch lever 14 so as to displace the clutch sleeve 41 to the position shown in FIG. 1. The main and auxiliary clutches 2 and 13 are fashioned to be engaged and disengaged in a manner which will be detailed hereinafter.

In FIG. 8, characters $P_1$ and $P_2$ represent respectively clutch-disengaging and -engaging positions of the clutch arm 48 for the auxiliary clutch 13. On the upper surface of transmission casing 3 is provided a stopper projection 53 which limits a rotation of the clutch arm 48 when it has been rotated to the clutch-engaging position $P_2$ by an operation of the clutch lever 14. It is fashioned that, when the clutch arm 48 has reached the clutch-engaging position $P_2$ shown in FIG. 8, the rotatable arm 2b of the main clutch 2 shown in FIG. 2, which arm is also rotated by the operation of clutch lever 14, still takes a position where tightening of the belt 23 by the tightening roller 2a is not caused. A further operation of the clutch lever 14 will cause a displacement or rotation of the rotatable arm 2b to its belt-tightening position while causing a tension of the spring 50 between the clutch arm 48 and control cable 51 shown in FIG. 8. Conversely, when the clutch lever 14 is released for a clutch-disengaging purpose, spring 50 becomes shortened so as to pull the cable 51 towards such spring 50. The clutch lever 14 will go down spontaneously to loosen the cable 24, and the rotatable arm 2b will be rotated by the force of spring 2c to disengage the main clutch 2. Then, the clutch arm 48 will be rotated by the force of spring 52 to the clutch-disengaging position $P_1$ shown in FIG. 8.

The walking mower shown in FIG. 2 is driven to travel for a mowing purpose with the clutch lever 14 being grasped by an operator behind the mower. Before a shifting operation of the key-shift transmission mechanism 8, the main and auxiliary clutches 2 and 13 are disengaged by releasing the clutch lever 14. These clutches are also disengaged when the operator intends to retreat the mower by pulling the steering handle 18 for unmowed turfs found behind him or the like.

When the clutch lever 14 is grasped again for engaging the main and auxiliary clutches, the main clutch 2 which may tighten the belt 23 gradually without causing a shock becomes engaged after the auxiliary clutch 13 has been engaged. Consequently, a sudden start of the rotation of rear wheels 7 which might cause a floating state of the front wheels 17 is well avoided and the mower will start in a smooth manner owing to a shock-free engaging of the main clutch 2.

In FIGS. 9 to 13, there is shown a second preferred embodiment of the present invention in which a ball clutch is employed as a clutch 13 for connecting and disconnecting between the speed-change shaft 5 and axle 6.

In this second embodiment, the hollow speed-change shaft 5 has a diameter-reduced end portion 5a which includes therein a pair of radial thorough bores 71. In these bores are received a pair of balls 72 which are movable radially of the change shaft 5. Within the end portion 5a of change shaft 5, the outer surface of axle 6 is formed with a pair of recesses 73 into which inner halves of the balls 72 may project. The interval D referred to before is also provided, and a clutch sleeve 74 is disposed within such interval. The sleeve 74 is mounted slidably and rotatably on the axle 6 and has at its inner circumference a first sloped cam surface 74a for pushing balls 72 radially inwardly of the axle 6 and a second sloped cam surface 74b for keeping balls 72 at their pushed-in positions or clutch-engaging positions.

When the clutch sleeve 74 is located at a position shown with respect to an upper half of such sleeve in FIGS. 9 and 10 and shown in FIGS. 11 and 12, each ball 72 is located at its clutch-engaging position where a side end surface of each bore 71 in the change shaft 5 pushes the ball against a side end surface of each recess 73 in the axle 6 so as to transmit a rotation of the change shaft 5 to axle 6. When the clutch sleeve 74 is displaced away from the change shaft 5 to another position shown with respect to a lower half of such sleeve in FIG. 9 and shown in FIG. 13, a reaction force, which is applied to each ball 72 by the axle 6 and has a component directed radially outwardly of the axle, will get the ball out of recess 73 so that the auxiliary clutch 13 becomes disengaged.

A snap ring 75 is disposed on the axle 6 for limiting a sliding movement of the clutch sleeve 74 towards the change shaft 5 at the clutch-engaging position of sleeve 74, as shown in FIG. 12. The other parts of the second embodiment are fashioned similarly to the corresponding parts of the first embodiment and are designated by like numerals.

Each of the auxiliary clutches 13 employed in the first and second embodiments is kept in its engaged condition by grasping a clutch lever continuously. During such grasping of the clutch lever, a biasing force of spring means, such as spring 52 shown in FIG. 8, for disengaging the clutch is applied continuously to operator's hands. Consequently, it is preferred to lower a force required for disengaging the clutch from an engaged condition thereof so that the biasing force of spring means set forth above may be reduced. In this respect, the auxiliary clutch employed in the second embodiment is superior to the one employed in the first embodiment by the reason which will be detailed hereinafter.

The auxiliary clutch 13 employed in the first embodiment requires, for detaching the meshing clutch teeth 43 and 44 shown in FIG. 1, to displace the clutch sleeve 41 against a frictional force acting between these teeth 43 and 44 and against another frictional force acting between the clutch sleeve 41 and a pin 42 shown or another means, such as a sliding key or spline, for connecting the clutch sleeve non-rotatally but slidably to the axle 6. The last-mentioned frictional force is considerably large at a condition where the key-shift transmission mechanism 8 is shifted to a lower speed ratio and rotation speed of the axle 6 is thus low. It is thus seen that the biasing force of the spring 52 shown in FIG. 8 must be large enough to disengage the clutch even at the lowest speed ratio of the transmission mechanism 8.

Contrarily to this, the clutch sleeve 74 employed in the second embodiment is mounted freely rotatably on the axle 6. Consequently, such clutch sleeve 74 may be displaced from the clutch-engaging position shown in FIG. 12 only against a frictional force acting between the ball 72 and clutch sleeve 74. In addition to this, the sleeve 74 includes a slightly sloped cam surface 74b by which a reaction force of the rotating axle 6 is applied through balls 72 to the clutch sleeve 74 effectively at an initial stage of clutch-disengaging operation. It is thus seen that spring means to be provided in the second embodiment for disengaging the auxiliary clutch 13 may have a relatively small biasing force.

I claim:

1. A transmission for self-propelled walking mowers comprising: an engine (1); a main clutch (2); a transmission casing (3); a drive shaft (4) journalled in said transmission casing and drivenly connected to said engine through said main clutch; a hollow speed-change shaft (5) journalled in said transmission casing and extending parallel with said drive shaft, one end of said speed-change shaft being spaced axially from an inner wall surface of said transmission casing by an interval (D); an axle (6) extending through said speed-change shaft and through said transmission casing and drivingly connected to left and right drive wheels (7); a key-shift transmission mechanism (8) disposed within said transmission casing and having a plurality of drive gears (9I, 9II, 9III, 9IV, 9V) fixedly mounted on said drive shaft, a plurality of speed-change gears (10I, 10II, 10III, 10IV, 10V) mounted rotatably on said speed-change shaft and meshed respectively with said drive gears, and a shift key (12) disposed slidably within an elongated axial groove (11) in the outer surface of said speed-change shaft and including a gear-engaging lug (12a) for coupling said speed-change gears one at a time to said speed-change shaft; an auxiliary clutch (13) disposed within said interval and operable to connect and disconnect between said speed-change shaft and said axle; and a clutch lever (14) connected to both of said main clutch and said auxiliary clutch and operable to engage and disengage said main and auxiliary clutches together.

2. The transmission of claim 1, wherein said auxiliary clutch (13) comprises a clutch sleeve (41) disposed within said interval (D) and mounted slidably but non-rotatably on said axle (6), said hollow speed-change shaft and said clutch sleeve having interengageable clutch teeth (43, 44).

3. The transmission of claim 1, wherein said auxiliary clutch (13) comprises a ball (72) which is received in a radial thorough bore (71) formed in one end portion of said hollow speed-change shaft (5) and is movable radially of said speed-change shaft; a recess (73) which is formed in the outer surface of said axle (6) and into which an inner half of said ball may project so as to connect between said speed-change shaft and said axle; and a clutch sleeve (74) disposed within said interval (D) and mounted slidably and rotatably on said axle, said clutch sleeve having at its inner circumference a sloped cam surface (74a) for pushing said ball raidally inwardly of said axle.

* * * * *